United States Patent Office 3,636,110
Patented Jan. 18, 1972

3,636,110
IMINES
Harold I. Weingarten, St. Louis, William A. White, Creve Coeur, and John P. Chupp, Kirkwood, Mo., assignors to Monsanto Company, St. Louis, Mo.
No Drawing. Filed June 20, 1966, Ser. No. 558,584
Int. Cl. C07c 119/00
U.S. Cl. 260—566 R
6 Claims

ABSTRACT OF THE DISCLOSURE

The present invention relates to the preparation of imines, particularly sterically hindered imines.

---

The present invention relates to the preparation of imines, particularly sterically hindered imines. It is also an object of the invention to prepare imines by a novel process employing inexpensive starting materials.

The preparation of imines by known methods has been characterized by inability to prepare the sterically hindered members of the series as well as imines from volatile amines. For example, the conventional method for the preparation of imines by reacting a ketone or aldehyde with a primary amine in the presence of a drying agent such as potassium hydroxide usually does not permit the obtainment of the sterically hindered compounds due to low reaction rates and self-condensation.

It has been found that the preparation of imines, particularly the sterically hindered imines and also imines derived from volatile amines is readily carried out by the reacting of a carbonyl compound, for example, a ketone or aldehyde with an aminating reagent providing a primary amine group, this reagent being selected from the group consisting of (a), tris(monosubstitutedamino) metal and tetrakis (monosubstitutedamino) metal compounds, (b), tris(monosubstitutedamino) halo metal and bis(monosubstitutedamino) halo metal compounds, the halo substituent being chlorine, bromine or iodine, and (c), the combination of a metal halide (e.g. the chloride, bromide or iodide) with a primary amine, $RNH_2$. In the present process, ammonia also undergoes the imine forming reaction.

The carbonyl compounds which are employed in the practice of the present invention have the general formula:

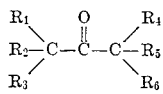

In the carbonyl component, and in the amino component, the substituents R, $R_1$, $R_2$, $R_3$, $R_4$, as well as the ultimate substituents $R_5$ and $R_6$ on the imine product (shown below) are the same or different members of the class consisting of hydrogen, alkyl radicals having from 1 to 20 carbon atoms, including straight chain and branched chain alkyl and cycloalkyl, for example, methyl, ethyl, propyl, isopropyl, butyl, isobutyl, secondary butyl, tertiary butyl, pentyl, hexyl, cyclohexyl, heptyl, octyl, nonyl, and decyl radicals, and aryl radicals having from 6 to 30 carbon atoms, for example, tolyl and xylyl radicals. The groups of R, $R_1$, $R_2$, $R_3$, $R_4$, $R_5$ and $R_6$ also include the radicals of the class consisting of polycyclic radicals, for example, indanyl, as well as steroids, e.g., chloestanone, and terpenes, for example, camphor. The above radicals may be unsubstituted or substituted such as with carboxyl, e.g. ethyl carboxylate and cyano substituents.

In the above described metal compounds, the said metal is generally used in its highest valence state, employed singly or in combination, being selected from the group consisting of titanium, iron, aluminum, tin, arsenic, antimony, zirconium, hafnium, ruthenium, osmium, boron, gallium, germanium, lead, bismuth, scandium, vanadium, yttrium, niobium, and phosphorus (including $P=O$ and $P=S$ moieties). A preferred group consists of titanium, iron, aluminum, tin, arsenic, antimony, zirconium, hafnium, ruthenium, osmium, boron, gallium, germanium, lead and bismuth. A more preferred group consists of titanium, iron, aluminum, tin, arsenic, and antimony.

Thus, the amination of the carbonyl is accomplished either by the use of a primary amino substituted metal or halo metal compound, or by the use of a primary amine per se, in combination with a metal halide, e.g., titanium tetrachloride or aluminum trichloride. The use of the metal halides provides the advantage of readily avaialble, inexpensive starting materials.

The products of the present invention are imines having the general formula,

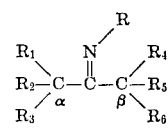

where the R, $R_1$, $R_2$, $R_3$, $R_4$, $R_5$ and $R_6$ substituents, as set forth above, are selected from the group consisting of hydrogen, alkyl radicals having from 1 to 20 carbon atoms, aryl radicals having from 6 to 30 carbon atoms, and the radicals of the class having from 6 to 30 carbon atoms and being selected from the class consisting of polycyclic radicals, steroids and terpenes, with the proviso that at least one of the criteria of (a), (b), (c) and (d) is satisfied:

(a) When the imine has an open chain structure, the alpha carbon atom is quaternary, (b) When the imine has an open chain structure, both the alpha and beta carbon atoms are branched, (c) When at least two of the aforesaid substituents are joined in the same ring structure, at least one of the said substituents attached to a carbon atom adjacent to the $=C=N-R$ group is quaternary at a site adjacent to the said carbon atom, (d) When at least two of the aforesaid substituents are joined in the same ring structure, then both the alpha and beta carbon atoms are branched.

The process of preparing the present imines comprises admixing an amine component selected from the group consisting of (a), tris(monosubstitutedamino) metal and tetrakis(monosubstitutedamino) metal compounds, (b), tris(monosubstitutedamino) halo metal and bis(monosubstitutedamino) halo metal compounds and (c), the combination of a metal halide (e.g. the chloride, bromide or iodide) with a primary amine, $RNH_2$, and a carbonyl compound, as described above. The reaction is conducted at a temperature of from $-50°$ C. to $150°$ C., a preferred temperature range being from $0°$ C. to $100°$ C. The pressure imposed upon the system is not a critical variable, but may be varied as convenient in the range of from atmospheric pressure to 100 pounds per square inch. It is not necessary to employ a solvent in carrying out the invention, although a non-reactive solvent, for example, an ether, e.g. ethyl ether, tetrahydrofuran, dioxane, or bis(2-methoxyethyl)-ether is convenient. Other solvents which are representative include hydrocarbons, for example, benzene, pentane, toluene and hexane.

In order to illustrate the improvement of the present invention over other methods the following comparison is made:

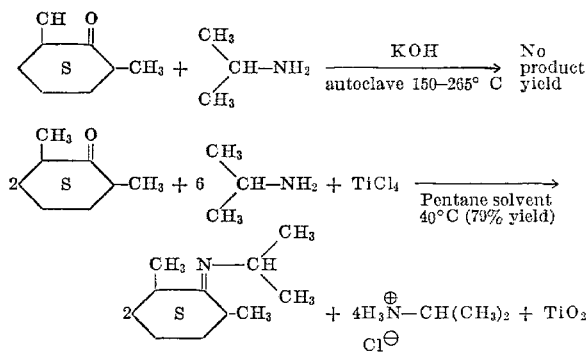

It is thus observed that the autoclave method in this reaction (first equation) cannot achieve the production of more sterically hindered imines. In contrast, the titanium reagent results in a good yield of sterically hindered products being obtained. The precise mechanism of the present process is not completely understood, but it is apparent that the use of the reagents set forth herein gives sterically hindered compounds which cannot be obtained by any other known process.

The following examples illustrate specific embodiments of the present invention.

EXAMPLE 1

2,6 - dimethyl-N-iso-propylcyclohexanimine.—The carbonyl compound 2,6-dimethylcyclohexanone (63 g., 0.5 mole) is dissolved in 300 ml. ethyl ether with 1.5 mole isopropyl amine (88.5 g.). To this solution is added a pentane solution (200 ml.) containing 48 g. (0.25 mole) $TiCl_4$ following conventional precautions to avoid exothermic reaction with ether. The addition is made over a period of about 45 minutes. After permitting the stirred solution to come to room temperature over another hour, the reaction mixture is refluxed for one and one-half hours, then permitted to stand at room temperature overnight. The final absorption intensity ratio C=N/C=O (infrared at ca. 5.9 and 6.1 m$\mu$ respectively) after this time is 13.5/1. The ether solution is filtered, salt-cake washed with more ether, then the solvent removed and residue distilled. Less than 1 g. of forerun is collected while the imine (65.6 g.) is distilled at 69–71° C. (10 mm.). The refractive index of the product is $n_D^{23}$ 1.4554.

EXAMPLE 2

2-tert-butyl-N-ethylcyclohexanimine.—Anhydrous ethyl amine (100 g., 2.21 mole) is mixed in a 2 liter flask with 2-tert-butylcyclohexanone (0.7 mole, 108 g.) and 500 ml. pentane. To the stirred mixture is added 0.38 mole $TiCl_4$ (72.4 g., or 42 ml.) contained in 250 ml. pentane. Addition takes place at between —5° C. and 0° C. Temperature control is maintained by a suitable exterior Dry Ice-acetone bath. After 45 minutes, all of the $TiCl_4$ solution has been added, and the mixture contains an orange precipitate. The reaction mixture is permitted to warm to room temperature over one hour, then heated in refluxing pentane for one and one-half hours. An aliquot of the orange reaction mixture is taken, washed with pentane, filtered through a double layer of filter paper, and the filtrate partially evaporated. In order to carry out an analysis, the oil is placed between two IR salt plates and C=O/C=N absorption at about 6.0 m$\mu$ measured at 0.89/0.42. Most of the pentane is removed by distillation and toluene added. Over a period of one and one-half hours the solution is heated to 85° C. At this time a sampling shows C=O/C=N at 0.085/ 0.26, with noticeable lightening of the orange precipitate. The material when heated at 90° C. for 45 minutes gives C=O/C=N at 0.065/0.35. A further 45 minute heating at 90° C. shows no improvement in imine content. The mixture is cooled, filtered and the salt cake washed with pentane, and filtrate filtered once again. The solvent is removed to give the crude imine (C=O/C=N 0.10/0.45). Distillation through 2 ft. Vigreux yields mostly ketone at 89–94° C./12 mm. and 71.3 g. imine at 94– 97° (12 mm.). The refractive index of the product is $n_D^{23}$ 1.4665.

EXAMPLE 3

2-tert-butyl - N,6 - dimethylcyclohexanimine.—2 - tertbutyl-6-methylcyclohexanone (0.6 mole, 101.0 g.) is placed in a 2 liter flask and mixed with a solution of ether (450 g.) containing 59 g. of condensed anhydrous methyl amine. At —10° C. a solution of 36 ml. $TiCl_4$ (62 g., 0.326 mole) contained in 200 ml. pentane is added over 45 minutes. After all the $TiCl_4$ has been added, the mixture is allowed to warm to room temperature over one hour, then heated to reflux (35–40° C.) for one-half hour. After this time a sampling shows only C=O (no C=N). The bright orange-red reaction mixture is stripped of the low-boiling ether-pentane solvent and about 400 ml. toluene added. The material is then heated to 110° C. After five hours, the solution is cooled and then left to stand overnight. The brown-tan colored mixture is sampled at this time and found to have an I.R. absorption ratio (ca. 6 m$\mu$), C=O/C=N of 1/1. An additional five hours heating does not change this ratio. The material is cooled filtered and the salt-cake washed with more toluene. The filtrate and washings are combined, solvent removed and the residue filtered through clay. The oil is taken up in ether and treated with anhydrous HCl to give a syrupy salt. The ether layer is decanted, and the syrup dissolved in cold water, and shaken with ether twice, after which the resulting aqueous solution is treated with $Na_2CO_3$ and ether. The ether layer is dried over $MgSO_4$, evaporated and residue distilled to give 11 g. pure imine at 95° C./15 mm., $n_D^{23}$ 1.4702.

EXAMPLE 4

N,3,5,5-tetramethyl-2 and 3-cyclohexenimines.—Isophorone (83 g., 0.6 mole) is placed in a 2 liter flask with 1.9 mole (59 g.) anhydrous methyl amine dissolved in 400 ml. toluene. At —10° C., 36 ml. $TiCl_4$ (0.326 mole) dissolved in about 50 ml. toluene is added. The mixture turns a dark brown. After permitting the reaction mixture to warm to room temperature after addition of $TiCl_4$, a sample shows the presence of some C=O. The mixture is heated at 90° C. for two hours, cooled, let stand overnight, the material filtered, and the salt-cake washed with more toluene. After removing solvent from combined filtrate and wash, the residue is distilled through a Vigreux column to give only one fraction at 92° C./15–16 mm. (25.7 g.). The distillate, although originally colorless, turns a dark blood-red on even minimum exposure to air. N.M.R. analysis reveals this product to be a mixture of the 2,3-delta and 3,4-delta imine.

Analysis.—Calcd.: N, 9.25%; found: N, 9.31%. $n_D^{23}$ 1.4935. A further distillation yields the separate compounds.

EXAMPLE 5

N - ethyl - 2,3 - dimethylcyclohexanimine.—2,3 - dimethylcyclohexanone (20 g., 0.159 mole) is placed in a 500 ml. flask with 25 g. ethyl amine (0.55 mole) dissolved in 100 ml. toluene. To this mixture is added 0.085 mole $TiCl_4$ (in 50 ml. toluene) at —20° C. to —10° C. over a period of 15 minutes. The mixture is then heated at 90° C. for one hour, and is then allowed to stand overnight; at this time, sampling shows only C=N and no C=O. However, upon filtering and washing the salt-cake with benzene, the residue (after solvent removel) shows C=O/ C=N at 0.07/0.38. The material on distillation gives one grame forerun (C=O/C=N 9.29/0.35), and the product (13.0 g.) at 81° C./14 mm.

EXAMPLE 6

N-iso-propylcamphorimine.—The starting material dl-camphor (0.2 mole, 30.4 g.) is mixed with 0.7 mole isopropyl amine (41.3 g.) in toluene and to this solution at 0° C.–5° C. there is added TiCl$_4$ (22.7 g.) dissolved in toluene. After addition an aliquot is taken, which however, upon mixing with pentane gives solid, and little residue on evaporation of the filtered pentane-toluene solution. This small residue contains only C=N however. The reaction mixture is then heated for about seven hours at reflux with slow precipitation of amine hydrochloride from hot toluene. After standing over the weekend at room temperature, the material is filtered twice after adding 500–700 ml. pentane. The toluene-pentane solution is vacuum treated to remove solvent and the residue distilled through an 18″ Vigreux to give 26.0 g., 98° C./17 mm. No forecut except toluene and only trace of residue found. The N.M.R. analysis indicates a camphor imine structure, $n_D^{23}$ 1.4690.

EXAMPLE 7

N - allyl - 2,6 - di - iso - propylcyclohexanimine.—The starting material, 2,6-diisopropylcyclohexanone (0.2 mole, 36.4 g.) is stirred into 200 ml. toluene with 0.7 mole allyl amine (40 g.). To this solution with agitation is added over a half hour, 14.0 ml. TiCl$_4$ contained in 60 ml. toluene at −5° C. to +5° C. The dark red-purple reaction mixture is heated to reflux where dark coloration, followed by precipitation occurs within 15 minutes. Further heating for 15 minutes followed by sampling gives C=O/C=N absorption 0.13/0.16. Further heating at reflux changes this ratio only to 0.12/0.23. About 2 g. TiCl$_4$ is added, with very exothermic reaction; after 15 minutes the solution shows C=O/C=N at 0.05/0.18. Additional TiCl$_4$ (1 g.) is added; the mixture is cooled and let stand overnight. Sampling indicates C=O/C=N at 0.04/0.15. The material is filtered, and the salt-cake washed with more solvent and the combined washings and filtrate are mixed with pentane to cause further precipitation. The crude product is filtered through clay, the pentane-toluene removed and the residue distilled to give 30.7 g. product boiling at 129–134° C./14 mm., $n_D^{23}$ 1.4763.

EXAMPLE 8

2,2 - dimethyl - N - phenyl - 1 - iso - propylpropylidinimine.—A solution of 2,2,4-trimethylpentanone 9.6 g. (.075 mole) in 50 ml. toluene is cooled in an ice bath and 20 g. (excess) aniline is added. To this solution is added slowly 10 g. (.075 mole) AlCl$_3$ also in toluene suspension. The reaction mixture is refluxed 16 hours. The solvent is removed and the residual oil distilled yielding the imine.

EXAMPLE 9

Preparation of N-methylbenzylidinimine.—To a solution of 11 g. (0.10 mole) benzaldehyde in an excess of methylamine in 100 ml. ethyl ether is added, slowly with cooling, 9.5 g. (0.05 mole) TiCl$_4$. The reaction is exothermic and a white precipitate forms immediately. After standing one hour at room temperature, the mixture is filtered and the solvent removed from the filtrate. The residual oil is distilled to yield N-methylbenzylidinimine.

The imines of the present invention are useful in the production of complex amides and amines. The two equations below show general preparation methods to obtain such amides and amines, but do not include the structural variations which are possible in the starting imines.

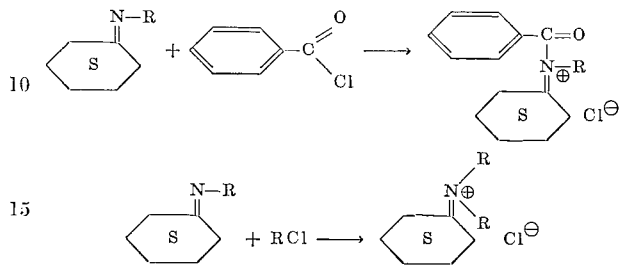

The imines themselves are of utility as plasticizers, e.g., for the plasticizing of vinyl chloride, as polymerization catalysts, e.g., in the polymerization of polyurethanes, and anti-oxidants, e.g., in rubber.

What is claimed is:

1. An imine compound selected from the group consisting of
   2,6-dimethyl-N-iso-propylcyclohexanimine,
   2-tert-butyl-N-ethylcyclohexanimine,
   2-tert-butyl-N,6-dimethylcyclohexanimine,
   N-ethyl-2,3-dimethylcyclohexanimine, and
   N-allyl-2,6-di-iso-propylcyclohexanimine.
2. 2,6-dimethyl-N-iso-propylcyclohexanimine.
3. 2-tert-butyl-N-ethylcyclohexanimine.
4. 2-tert-butyl-N,6-dimethylcyclohexanimine.
5. N-ethyl-2,3-dimethylcyclohexanimine.
6. N-allyl-2,6-di-iso-propylcyclohexanimine.

References Cited

UNITED STATES PATENTS

| | | | |
|---|---|---|---|
| 1,938,890 | 12/1933 | Britton et al. | 260—566 |
| 2,535,922 | 12/1950 | Haury et al. | 260—566 |
| 3,230,216 | 1/1966 | Stork | 260—566 |

FOREIGN PATENTS

| | | | |
|---|---|---|---|
| 514,329 | 11/1939 | Great Britain | 260—566 |
| 591,869 | 9/1947 | Great Britain | 260—566 |

OTHER REFERENCES

Beilstein's Handbuch der Organischer Chemie, vol. 7, p. 111 (1943).

Harold Strain, "Ammonolysis of Ketones," J. of the American Chemical Society, vol. 52, pp. 820–823 (1930).

Organic Chemistry, Morrison and Boyd (1959), p. 540.

Ritter, 55 J. Acs. 3322–3326, May–August 1933. A New Camphor Synthesis.

LEON ZITVER, Primary Examiner

G. A. SCHWARTZ, Assistant Examiner

U.S. Cl. X.R.

252—438; 260—32.6 R, 45.9 R, 814